United States Patent [19]

Kress

[11] 4,122,961
[45] Oct. 31, 1978

[54] POT HANDLLING TRAILER WITH COMPOUND ACTION

[75] Inventor: Edward S. Kress, Peoria, Ill.

[73] Assignee: Kress Corporation, Brimfield, Ill.

[21] Appl. No.: 846,813

[22] Filed: Oct. 31, 1977

[51] Int. Cl.² ............................................. B65G 65/04
[52] U.S. Cl. ....................................... 214/313; 298/11
[58] Field of Search ............... 214/312, 313, 314, 315; 298/11

[56] References Cited

U.S. PATENT DOCUMENTS

| 3,330,429 | 7/1967 | Kress ..................................... | 214/314 |
| 4,063,658 | 12/1977 | Kress et al. ........................... | 214/314 |

Primary Examiner—Robert G. Sheridan
Attorney, Agent, or Firm—Leydig, Voit, Osann, Mayer & Holt

[57] ABSTRACT

A trailer for lifting, carrying and dumping large heavy ladles used in foundries in which the ladle is supported by a compound pivot tilt frame with one set of linear actuators for swinging the ladle to a dumping position and a second set of linear actuators for continuing the swinging to a ladle inverting position. The pivot axes for swinging the ladle are located so that the ladle is transported centrally of the wheeled frame of the trailer and is swung rearwardly for dumping without lowering the trailer into contact with the ground.

2 Claims, 6 Drawing Figures

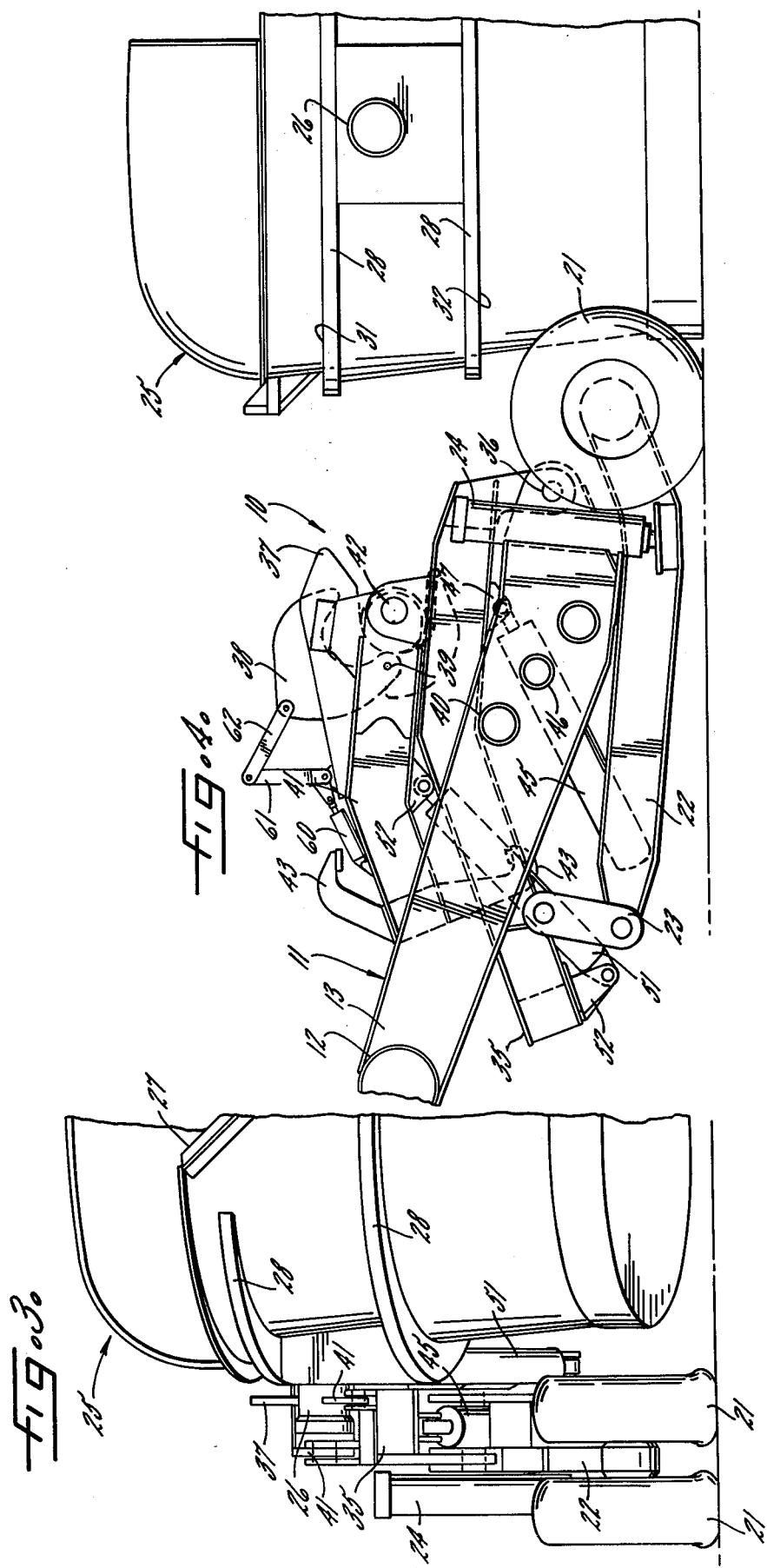

POT HANDLLING TRAILER WITH COMPOUND ACTION

This invention relates generally to load carrying trailers and concerns more particularly a trailer for lifting, carrying and dumping large heavy vessels.

A trailer generally of this type is disclosed and claimed in U.S. Pat. No. 3,330,429, issued July 11, 1976. As there described, the purpose of such vehicles is to handle, i.e. lift, carry and dump, heavy open-topped vessels such as pots or ladles laden with slag, scrap, skulls, etc. Such vessels are commonly used in the making and pouring of hot metals. Since heavy loads are encountered, it is desirable to utilize reliable, powerful linear actuators to lift and dump the vessels.

In the normal terminology of the art, a pot is a solid iron or steel casting having great strength and resistance to rough handling. To empty a pot, it is not unknown to tilt and then jar or bump the pot with great force to dislodge its contents. On the other hand, a ladle is normally a relatively thin shelled vessel that is lined with refractory material. While ladles are no less cumbersome than pots, and can be almost as heavy, they are relatively fragile and cannot be bumped or jarred — or else cracking of the refractory lining is highly likely.

When a pot or ladle is used to pour molten metal, it is common to find, after pouring, a kind of lining of partially solidified metal remaining in the vessel commonly called a skull. A pot can be tilted and severely jarred to dislodge and dump the skull. A ladle, which cannot be bumped, is normally completely inverted for gravity removal of the skull An aspect of modern foundry practice is to avoid the equipment congestion and generation of airborne dust and dirt from dumping skulls in the pouring shop, by carrying away the pots or ladles to a remote, more convenient location for dumping. This is a typical application for vehicles of the type referred to above. However, the need for virtual 180° rotation of a ladle in order to gravity dump a skull without bumping, combined with the use of linear actuators and the need to maintain leverage for controlling the load, presents the problem not so far met by prior designs.

Accordingly, it is the primary aim of the invention to provide an improved vessel handling trailer capable of lifting, carrying and swinging a ladle through a dumping arc of substantially 180°, i.e. to turn a heavy ladle upside down.

A further object of the invention is to provide a trailer as characterized above that is compact, so as to remain maneuverable in close quarters, and which requires no modification of the ladles being handled.

Other objects and advantages of the invention will become apparent upon reading the following detailed description and upon reference to the drawings, in which:

FIG. 3 is a fragmentary rear elevation taken approximately along the line 3—3 in FIG. 2;

FIG. 4 is a fragmentary side elevation showing an alternate position of the trailer of FIG. 1 in relationship to the ladle resting on the ground;

While the invention will be described in connection with a preferred embodiment, it will be understood that I do not intend to limit the invention to that embodiment. On the contary, I intend to cover all alternatives, modifications and equivalents that may be included within the spirit and scope of the invention as defined by the appended claims.

Figure 1:
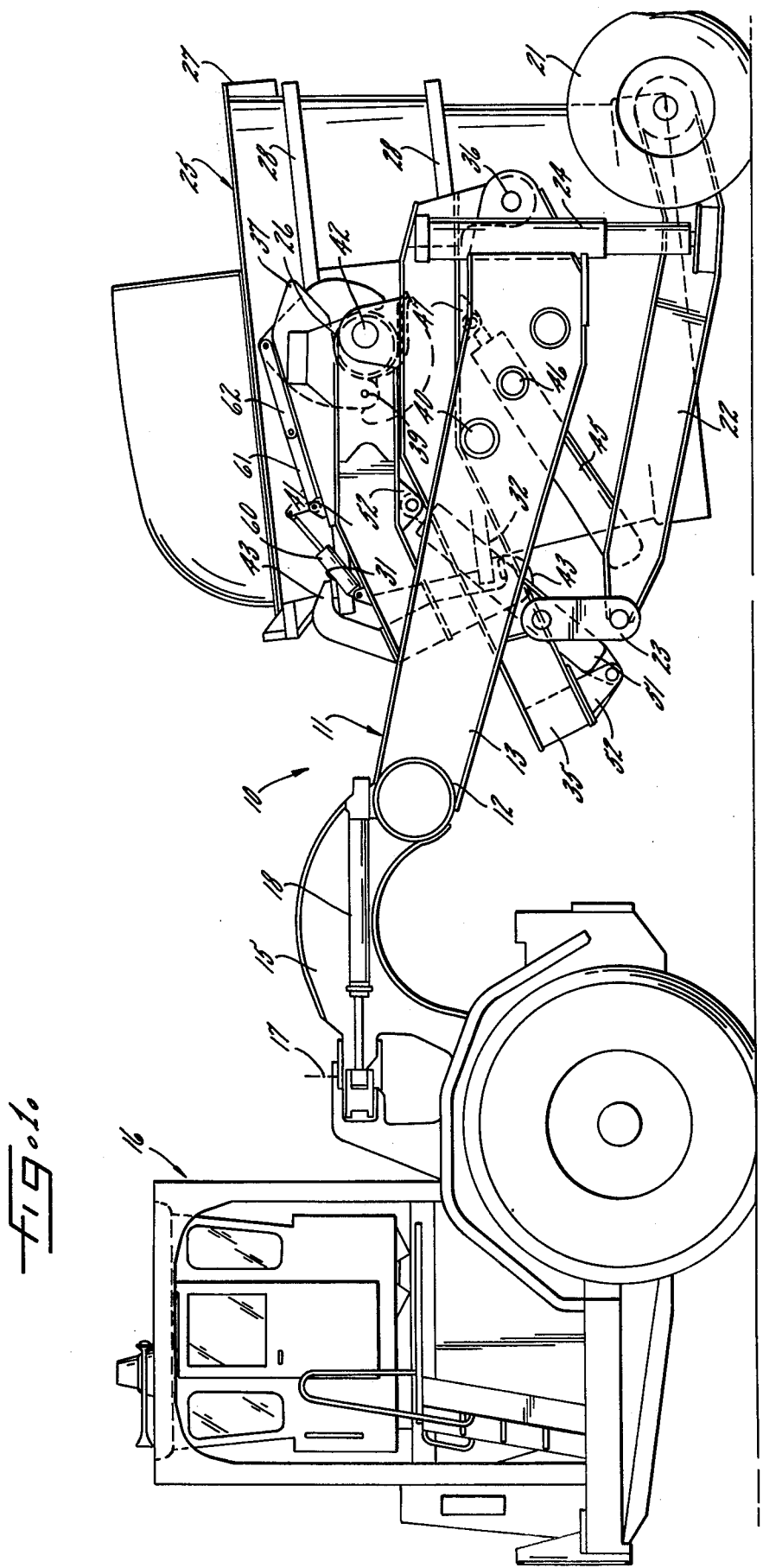
FIG. 1 is a side elevation of a trailer embodying the invention carrying a ladle held in transport position.
Figure 2:
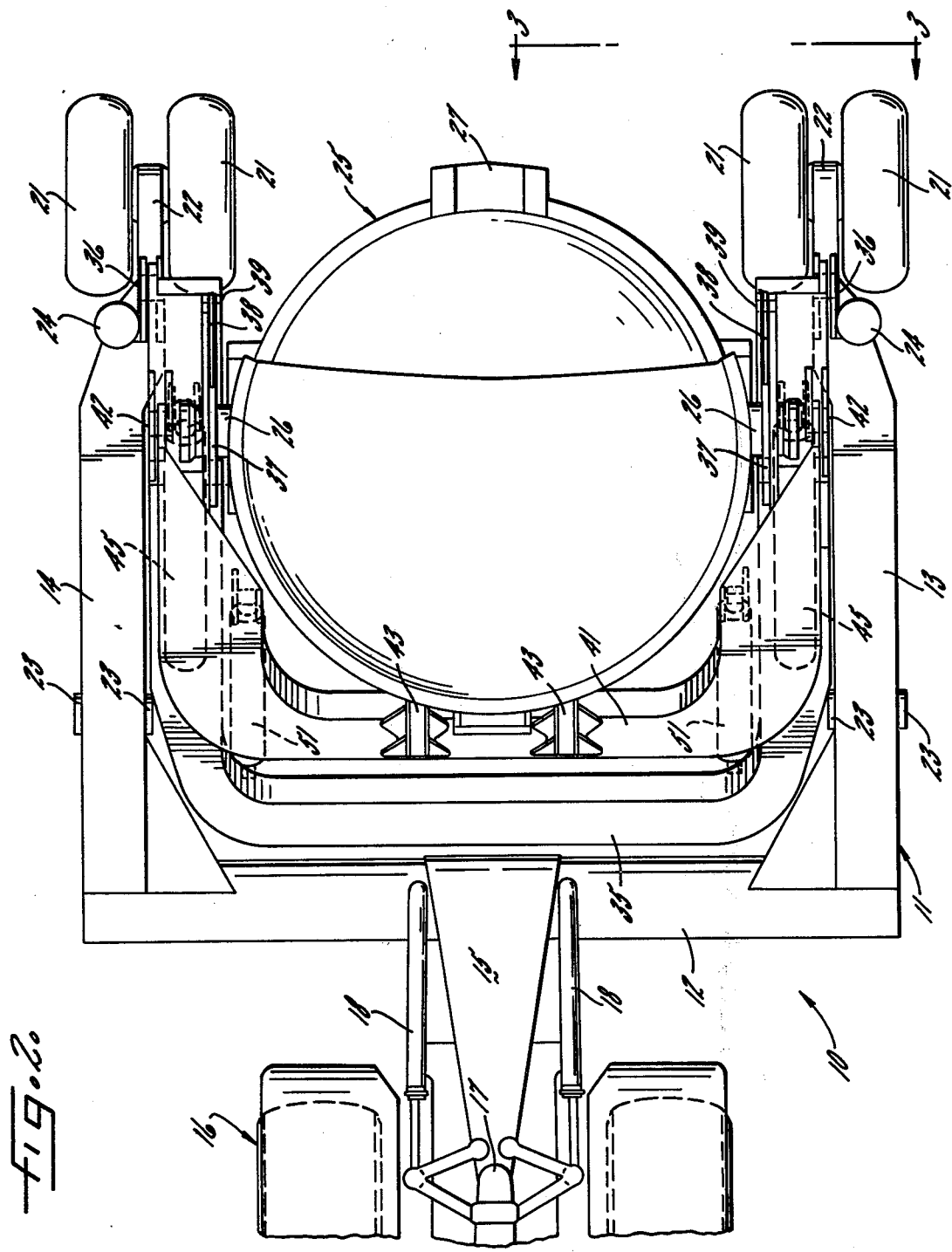
FIG. 2 is a fragmentary plan of the trailer shown in FIG. 1.

Turning first to FIGS. 1 and 2, there is shown a trailer 10 embodying the invention and including a main U-shaped frame 11 consisting of a tubular cross beam 12, side beams 13 and 14, and a gooseneck 15 coupled to a two-wheeled tractor 16 on a vertical axis 17. Steering actuators 18 couple the frame 11 and the tractor 16 so as to provide relative rotation about the axis 17, and the tractor 16 and gooseneck 15 are formed so that sharp, short radius turns can be made.

The trailer 10 rides on sets of dual wheels 21 journalled on beams 22 that are pivoted on the main frame 11 through links 23. Hydraulic actuators 24 interconnect the beams 22 and the ends of the side beams 13 and permit the main frame to be raised and lowered (compare FIGS. 1 and 4).

The ladle 25 to be handled by the trailer 10 is typically shaped with side trunnions 26, pouring spout 27 and substantially annular reinforcing ribs 28 that project from the ladle to define top and bottom reaction surfaces 31 and 32, respectively, spaced from the trunnions 26. A U-shaped cradle 35 is pivoted at 36 on the main frame 11 and is open-ended to embrace the ladle 25.

In accordance with the invention, a U-shaped reaction frame 41 is provided with hook portions 37 to engage and contain the trunnions 26 and is pivoted on the cradle 35 on axes 42 approximately aligned with the trunnions 26 when they are in the hook portions 37, and the reaction frame 41 rests on the upper surfaces of the cradle 35 and includes reaction pads 43 which fit about the top and bottom locking surfaces 31, 32 so that little or no relative movement is permitted between the frame 41 and the ladle 25 when the ladle is received within the cradle 35. A first set of linear hydraulic actuators 45 interconnect the main frame 13, at trunnions 46, with pin lugs 47 on the cradle 35, and a second set of linear actuators 51 interconnect the cradle 35 and the reaction frame 41 between sets of pin lugs 52.

For positively locking the pot 25 in the frame 41, U-shaped latches 38 are pivoted at 39 so as to embrace the trunnions 26 and completely close the hook portions 37. Actuators 60 operate bell cranks 61 connected by links 62 to the latches 38 so as to control the position of the latches and provide the required pivoting movement (see FIGS. 1 and 4). Under non-tilting conditions, the cradle 35 is anchored at the pivot pins 36 and rests on stub shafts 40 fixed in the side frames 13.

To lift the ladle 25, the trailer 10 is backed around to embrace the ladle with the actuators 24 retracted so that the main frame 11 carrying the cradle 35 and the reaction frame 41 are in their lowered positions. Upon engagement of the trunnions 26 by the hook portions 37 and the latches 38, and engagement of the reaction frame elements 43 with the reaction surfaces 31, 32, the actuators 24 are extended so as to lift the ladle into the FIG. 1 travelling position. It should be noted that the positions of the hook portions 37 are such that the trunnions 26, and hence the ladle 25, are positioned centrally of the wheeled frame so that the load is distributed to all ground engaging wheels.

Figure 5:
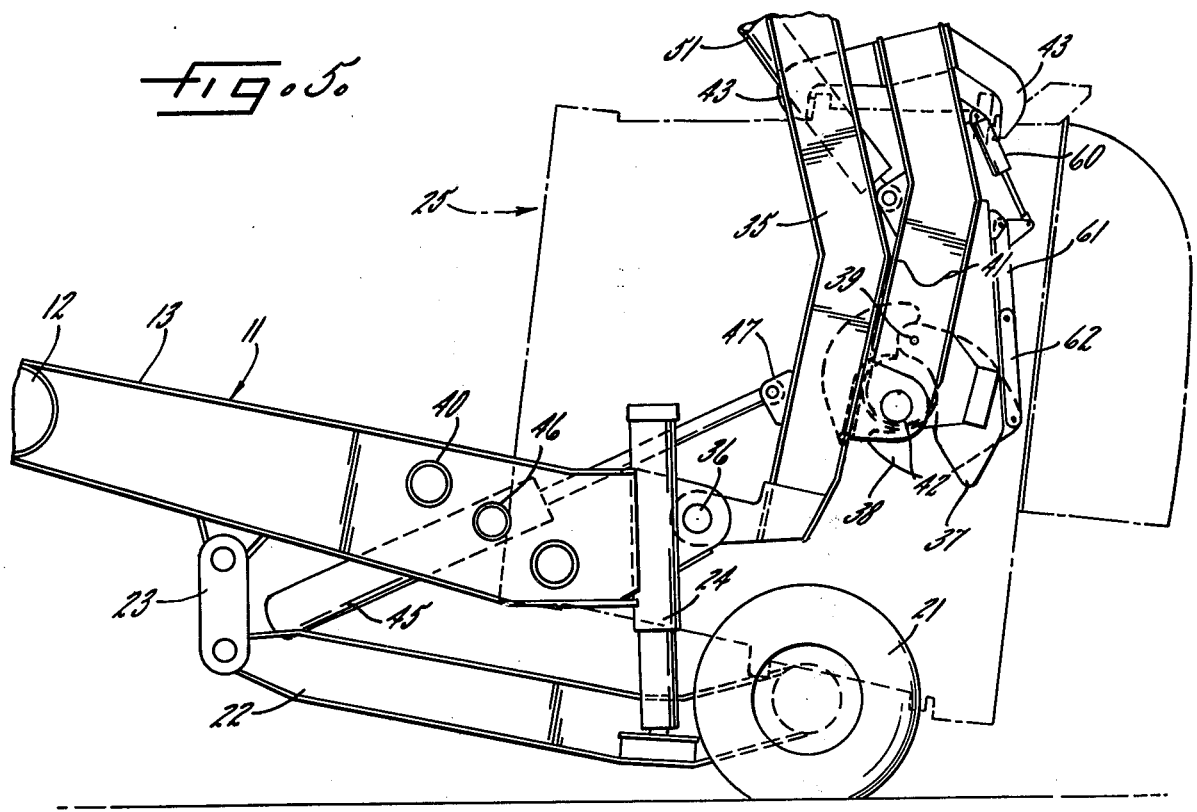
FIG. 5 is a side elevation of the ladle shown in FIG. 1 with the parts in ladle dumping position.

To dump the ladle, the actuators 45 are extended to swing the ladle to the FIG. 5 ladle dumping position. Because the cradle pivots 36 are spaced rearwardly of the lug engaging hook portions 37 in the FIG. 1 lifting position, swinging of the ladle to the FIG. 5 dumping position shifts the ladle rearwardly from the frame 11 so as to better clear the trailer when dumping. If desired, cables (not shown) can be provided to limit tilting of the cradle 35 relative to the frame 11 and relieve the actuators 45 from stress when the ladle is in over-centered, relative to the pivots 36, dumping position.

Figure 6:
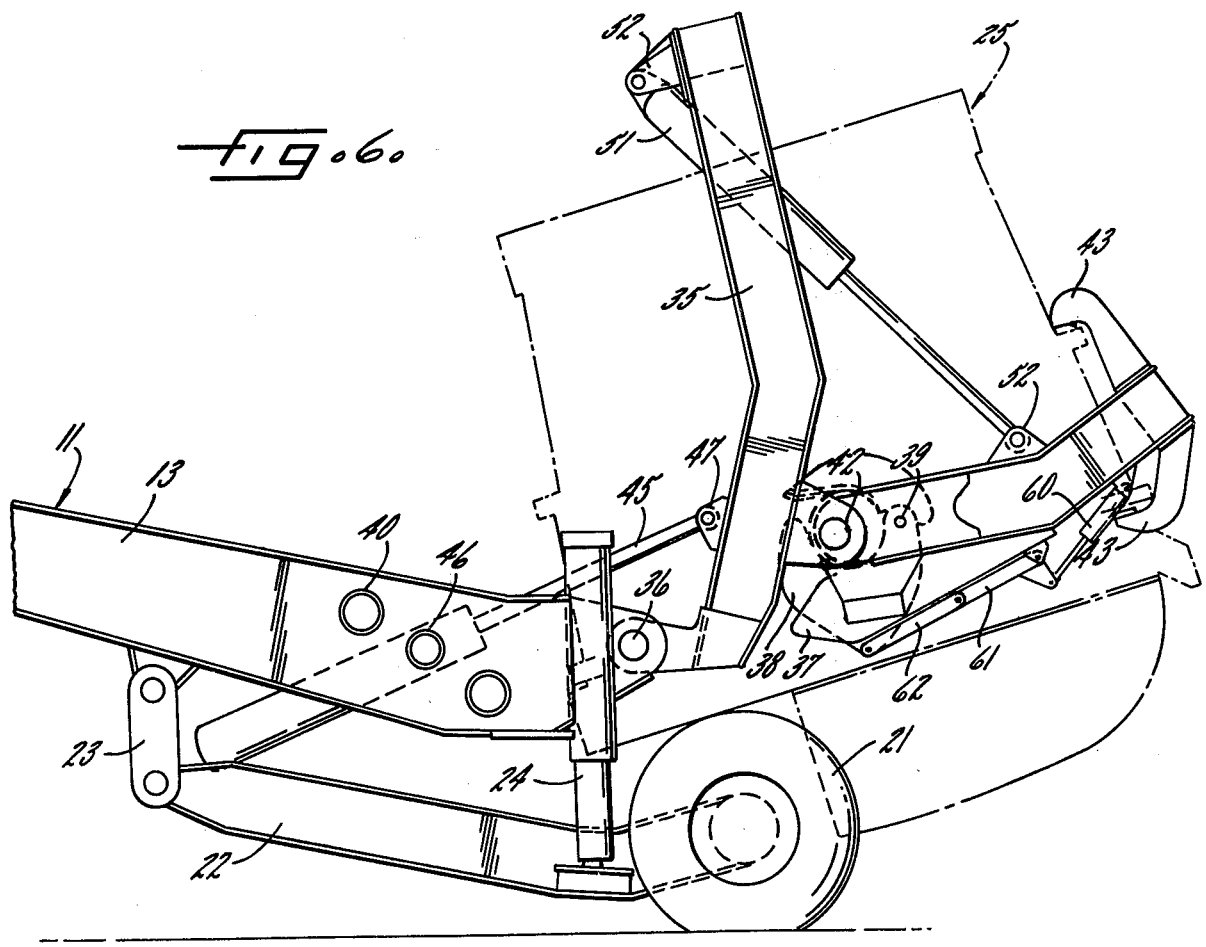
FIG. 6 is similar to FIG. 5 with the parts swung further into ladle inverting position.

The ladle is swung to the ladle inverted position of FIG. 6 by extending the actuators 51, thus accomplishing virtually a 180° inverting rotation of the ladle. Since the keeper frame axes 42 are approximately aligned with the trunnions 26, rotation of the ladle under the force of actuators 51 does not tend to vertically shift the ladle and therefore having the ladle strike the ground is avoided.

Those skilled in the art will appreciate that the trailer 10, despite the range of ladle tilting movement, remains compact so as to be highly maneuverable in close quarters. It will further be appreciated that no modification of the ladle is required in that the ladle is firmly engaged and locked using existing trunnions and surfaces.

I claim as my invention:

1. A trailer for handling a ladle having trunnions and a projection with top and bottom surfaces spaced from said trunnions, comprising in combination, a wheeled open-ended frame proportioned to embrace said ladle, a cradle pivoted on said frame and being open-ended to embrace said lable, a reaction frame pivoted on said cradle and having portions to engage and contain said trunnions in a position central of said wheeled frame, said frame having pads fitting about said top and bottom projection surfaces when said reaction frame portions contain said trunnions, means for elevating said cradle and reaction frame to a ladle carrying position, a first pair of linear actuators interconnecting said frame and said cradle for swinging the cradle, frame and ladle engaged by said cradle and frame to a ladle dumping position wherein said trunnions, and said ladle, are shifted out of said central position, and a pair of linear actuators interconnecting said cradle and said reaction frame for swinging the frame and ladle fitted in said frame pads to a ladle inverted position.

2. The combination of claim 1 in which said reaction frame pivot is positioned in substantial alignment with the trunnions engaged and contained on said frame so that said second pair of actuators in inverting said ladle does not tend to lower the ladle into the ground.

* * * * *